United States Patent
Quin et al.

(10) Patent No.: US 10,480,282 B2
(45) Date of Patent: Nov. 19, 2019

(54) CHOKE VALVE FOR HIGH PRESSURE DROP

(71) Applicant: Cameron International Corporation, Houston, TX (US)

(72) Inventors: David Quin, Longford (IE); Declan Elliott, Longford (IE); Michael McKeon, Longford (IE); Abinesh Gnanavelu, Longford (IE)

(73) Assignee: Cameron International Corporation, Houston, TX (US)

( * ) Notice: Subject to any disclaimer, the term of this patent is extended or adjusted under 35 U.S.C. 154(b) by 26 days.

(21) Appl. No.: 15/644,510

(22) Filed: Jul. 7, 2017

(65) Prior Publication Data

US 2018/0010421 A1    Jan. 11, 2018

Related U.S. Application Data

(60) Provisional application No. 62/360,242, filed on Jul. 8, 2016.

(51) Int. Cl.
    *E21B 34/02*    (2006.01)
(52) U.S. Cl.
    CPC .................. *E21B 34/02* (2013.01)

(58) Field of Classification Search
    CPC ........................................ E21B 34/02
    USPC ............................................. 166/316
    See application file for complete search history.

(56) References Cited

U.S. PATENT DOCUMENTS

| 5,020,568 A | 6/1991 | Taylor |
| 2003/0024580 A1 | 2/2003 | Bohaychuck |
| 2005/0115619 A1 | 6/2005 | Kawulka et al. |
| 2013/0247995 A1 | 9/2013 | Ehrlich |
| 2016/0281449 A1* | 9/2016 | Lorenson ................. E21B 4/02 |

FOREIGN PATENT DOCUMENTS

WO    2015/081432 A1    6/2015

OTHER PUBLICATIONS

PCT/US2017/041227 International Search Report and Written Opinion dated Sep. 28, 2017 (17 p.).

* cited by examiner

*Primary Examiner* — Taras P Bemko

(57) ABSTRACT

An orifice valve as disclosed herein produces a high pressure drop in a flowing fluid. A valve body includes a flow restrictor with multiple flow orifices or ports. The flow ports produce fluid jets. The flow ports may be angled relative to the axial centerline of the valve body.

20 Claims, 7 Drawing Sheets

CHOKE VALVE FOR HIGH PRESSURE DROP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to reducing the pressure of a fluid flowing from a well. More particularly, it relates to an apparatus and system for reducing the pressure of a fluid flowing from a hydrocarbon well. Still more particularly, this disclosure relates to apparatus and system for producing a high pressure drop in the fluid as may be applied to a well having higher than typical pressure.

When producing a fluid from a well or borehole that may contain a hydrocarbon, it is commonly necessary to reduce the pressure of the fluid at the well head, i.e., very soon after leaving the borehole. Reducing the pressure of the produced fluid reduces the strength requirements of the subsequent piping and valves that transport the fluid from the well. Thus, reducing the fluid pressure offers safety and economic benefits. The pressure reduction may be achieved by adding a flow restriction in the piping. For example, a choke valve may be used. For wells that discharge fluids having very high or relatively high pressure, it is common for the choke valve to erode prematurely due to the turbulent and possibly abrasive fluid flowing at high velocities. Improved valves configured to achieve a high pressure drop and having a greater resistance to wear would be advantageous to industry.

SUMMARY

In some embodiments, an orifice valve for reducing the pressure of a fluid flowing from an oil well includes a valve body including a body centerline and a through-bore, a flow restrictor including a body, an outer surface, and a plurality of elongate, fluidly parallel ports extending through the body, wherein the ports are configured with fixed dimensions, and the outer surface is received within the through-bore, and a wear sleeve disposed within the through-bore adjacent the flow restrictor and including an annular body, a flow channel extending through the body and including a straight section and an expanding section, wherein the flow channel is in fluid communication with the fluidly parallel ports. The ports of the flow restrictor may circumferentially surround the body centerline, wherein each port of the flow restrictor includes a port centerline, and wherein the port centerlines are disposed at a port angle with respect to the body centerline, the port angle being acute. The port centerlines may intersect within the wear sleeve. The port centerlines may intersect within the expanding section of the wear sleeve at a point along the body centerline. The port centerlines may extend through the wear sleeve, continue in that direction, and then intersect within the through-bore of the valve body beyond the wear sleeve. The flow ports may be circular, wherein for each flow port, the port length is greater than the port diameter.

In some embodiments, an orifice valve for reducing the pressure of a fluid flowing from an oil well includes a valve body including a body centerline and a flow path passing through the valve body, the flow path including an inlet section, a plurality of elongate flow ports disposed within the valve body, each port including a port inlet and a port exit and extending from the inlet section in the direction of the body centerline, the ports configured with fixed dimensions, a downstream flow channel located beyond the ports in the direction of fluid flow and having an inner surface and a straight section with a straight section diameter, wherein the port exits are arranged within a diametral extent that is less than the straight section diameter. The flow ports may be circular in cross-section, characterized by a diameter D, wherein the distance between the diametral extent and the straight section diameter measured along a radius from the body centerline is greater than or equal to the diameter D. Each of the flow ports may include a port centerline, wherein the inlets of the ports are more widely spaced apart than are the exits so that each port and the corresponding port centerline is oriented at a port angle with respect to the body centerline, the port angle being acute. The port centerlines may intersect within the downstream flow channel. The flow path within the valve body may further include an exit section extending from the downstream flow channel, and wherein the port centerlines intersect beyond the downstream flow channel. The orifice valve may further include a flow restrictor formed separately from the valve body and installed within the valve body, wherein the flow ports extend through the flow restrictor.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, which include the following figures.

NOTATION AND NOMENCLATURE

Figure 1A:
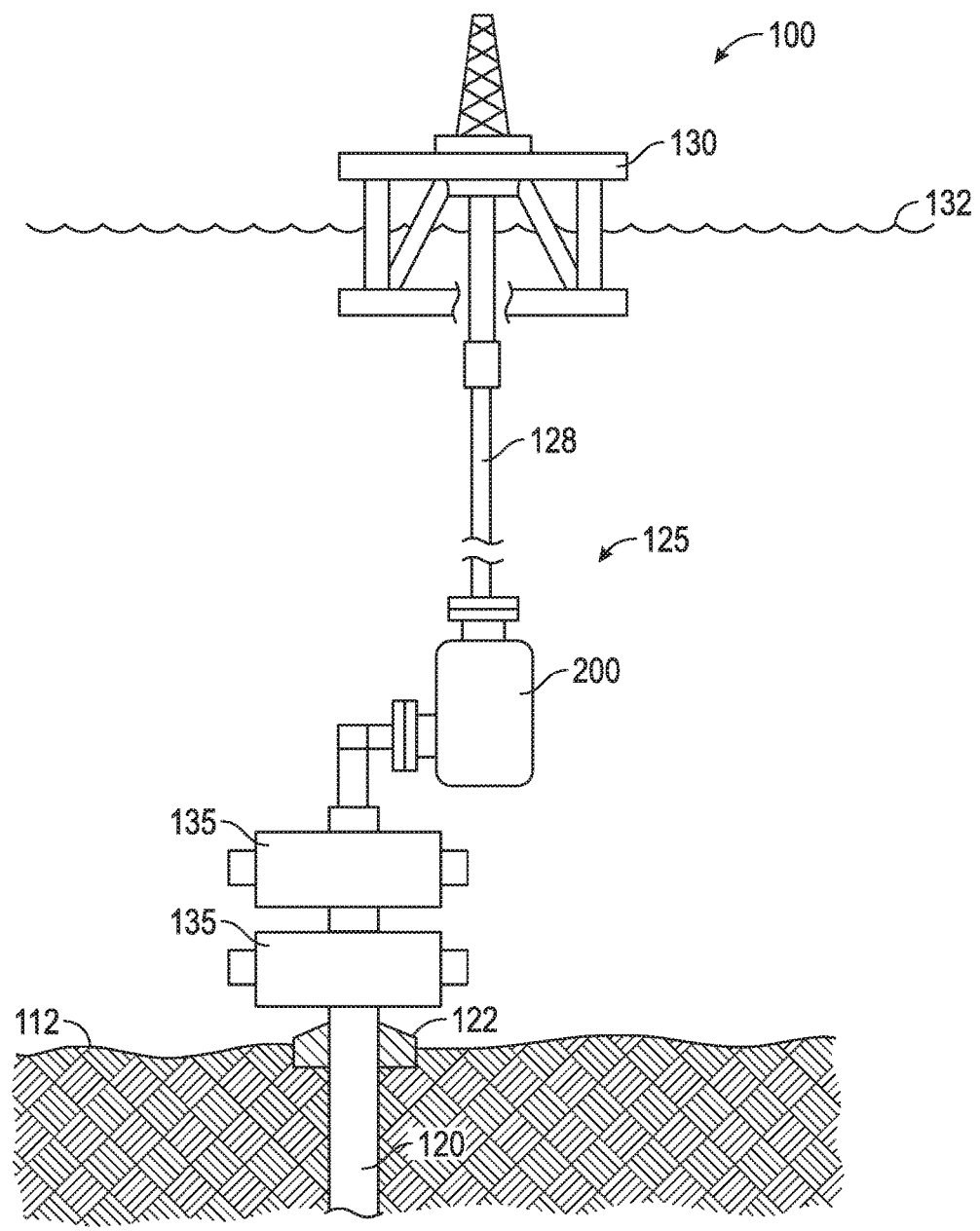
FIG. 1A shows a schematic elevation view of an embodiment of a hydrocarbon production system including a choke valve with multiple orifices for fluid flow in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the following definitions and ideas will apply:

The terms "including" and "comprising," as well as derivations of these, are used in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and any number of other factors. The word "or" is used in an inclusive manner. For example, "A or B" means any of the following: "A" alone, "B" alone, or both "A" and "B."

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upward," "down," "lower," "clockwise," "left," "leftward," "right" "right-hand," "down", and "lower." For example, a relative direction or a relative position of an object or feature may pertain to the orientation as shown in a figure or as described. If the object or feature were viewed from another orientation or were implemented in another orientation, it may be appropriate to describe the direction or position using an alternate term.

The use of ordinal numbers (i.e., first, second, third, etc.) to identify one or more components within a possible group of multiple similar components is done for convenience and clarity. The ordinal numbers used in the description below for members of a particular group of components may not necessarily correspond to the ordinal numbers used elsewhere when referring to various members of the same group or a similar group of components.

DETAILED DESCRIPTION

Referring to FIG. 1A, in an exemplary embodiment, a hydrocarbon production system 100 is configured to extract various production fluids containing minerals and natural resources, including hydrocarbon fluids (e.g., oil and/or natural gas), water, and combinations of these as examples, from a subterranean earthen formation 110 located below sea floor 112 via a well or wellbore 114. A casing 120 within well 114 extends from formation 110 through sea floor 112 and through a well head 122 and couples to a lower marine riser package (LMRP) 125. The LMRP 125 is coupled to a marine riser 128 which extends to a vessel 130 at waterline 132. Vessel 130 receives production fluids from the well 114. In this embodiment, vessel 130 is a floating platform, and thus, may also be referred to as platform 130. In other embodiments, the vessel can be a drilling ship or any other vessel disposed at the sea surface for conducting offshore drilling and/or production operations.

The LMRP 125 includes a blowout preventer (BOP) assembly 135 coupled to a choke or pressure reduction valve 200 configured for high pressure drop and having multiple flow orifices. Choke valve 200 reduces the pressure of the production fluid as it leaves casing 120 and BOP 135 prior to entering riser 128. The resulting pressure reduction reduces the internal stress that the fluid can exert on riser 128. Though choke valve 200 is shown in FIG. 1A coupled between BOP 135 and riser 128, in other embodiments choke valve 200 is a pressure reduction valve coupled between other components of the system 100 or into other flowlines or fluid conduits of the system 100.

Figure 1B:
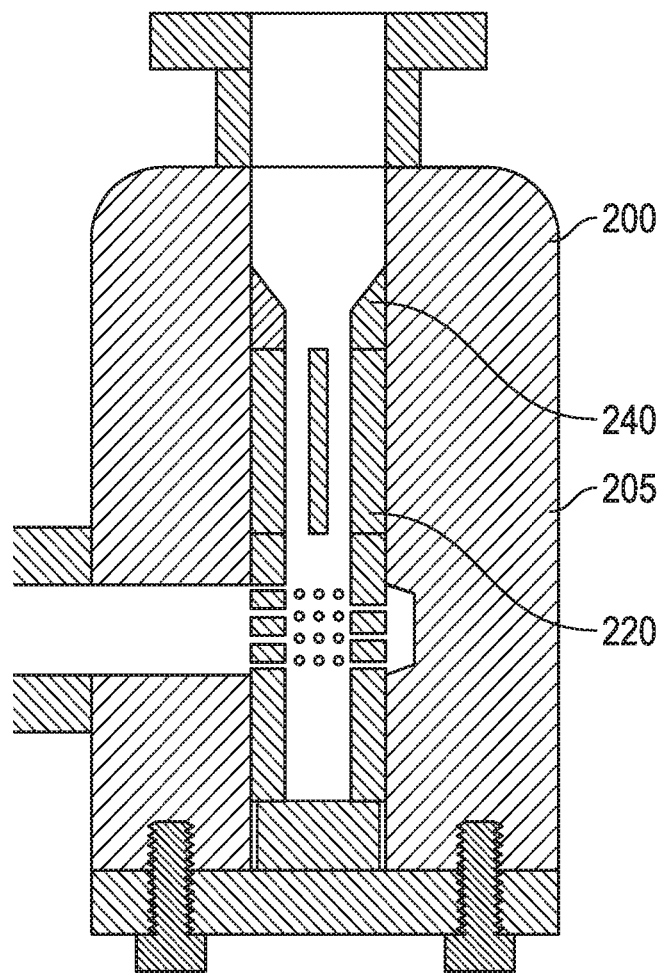
FIG. 1B shows a cross-sectional view of an embodiment of the choke valve of FIG. 1, in accordance with principles described herein, the valve having axially aligned orifices.
Figure 2:
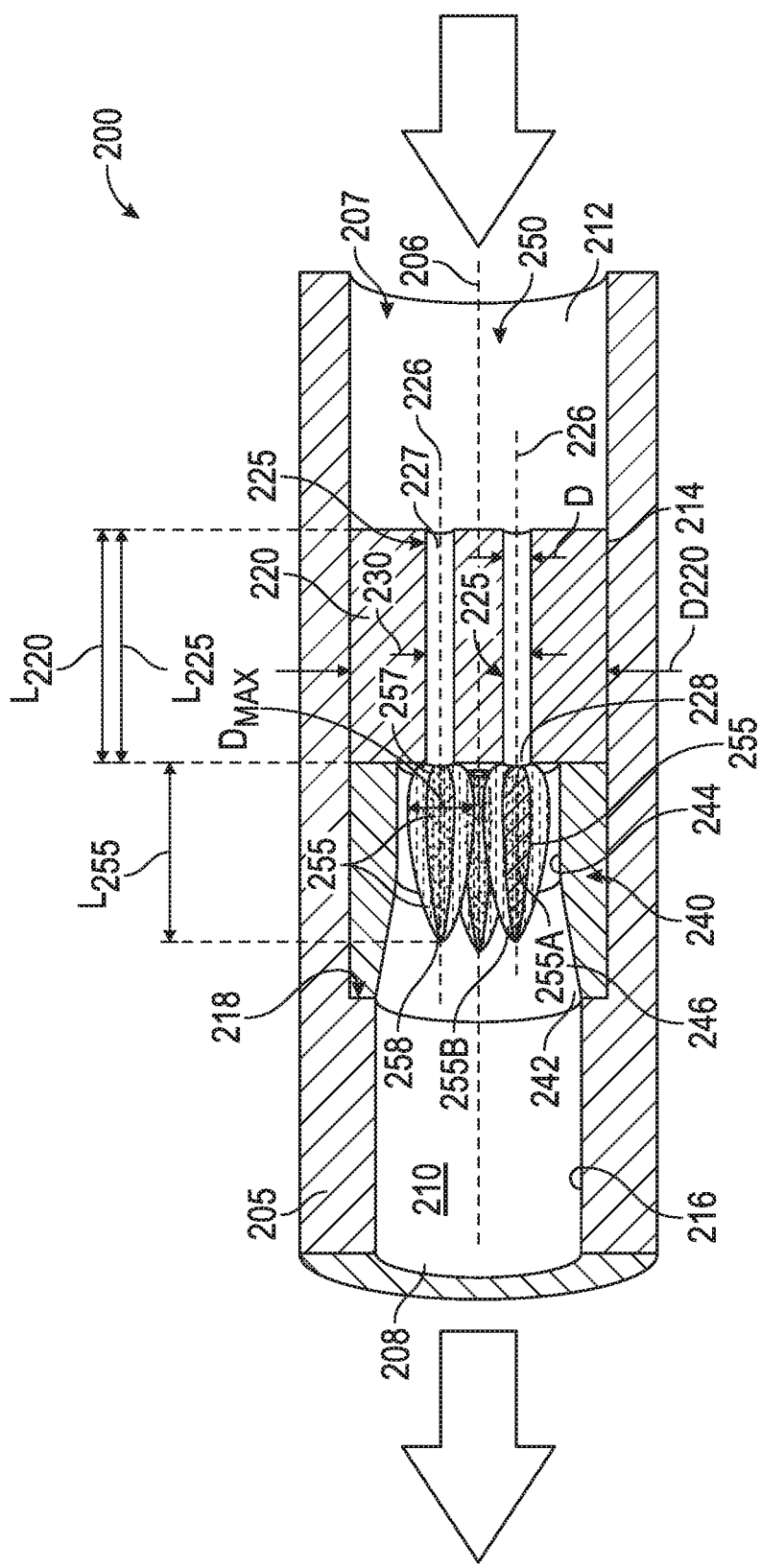
FIG. 2 shows a cross-sectional view of the embodiment of the choke valve of FIG. 1A and FIG. 1B with the valve body simplified, in accordance with principles described herein, the valve having axially aligned orifices.

Referring now to FIG. 1B and FIG. 2, in an embodiment, choke valve 200 includes a valve body 205 having a longitudinal or a centerline axis 206, an inlet 207 at a first end, an exit 208 at a second end axially displaced from the inlet 207, and a through-bore 210 extending from the inlet 207 toward the exit 208. Through-bore 210 has an inlet section 212 extending from the inlet 207 toward the exit 208 and having an inlet diameter, a mid-section 214 extending from inlet section 212, and an exit section 216 extending from mid-section 214 to exit 208. Choke valve 200 further includes a flow restrictor 220 and a wear sleeve 240 received within the mid-section 214 of through-bore 210. Wear sleeve 240 is held against a shoulder 218 formed at the intersection of exit section 216 and mid-section 214. A downstream end of flow restrictor 220 is held against or adjacent wear sleeve 240, and flow restrictor 220 extends to inlet section 212. Flow restrictor 220 and wear sleeve 240 are centered on and aligned with body centerline 206.

Flow restrictor 220, which may also be called an insert 220, includes a cylindrical body with multiple flow orifices 225 extending therethrough. Flow orifices 225 are generally parallel to centerline 206 and circumferentially spaced from one another about centerline 206. Flow orifices 225 may also be called flow passages or flow ports 225. At least in the exemplary embodiment, restrictor 220 is solid in locations radially between and beyond the ports 225, and restrictor 220 is elongate. Restrictor 220 and other flow restrictors disclosed herein may be made from carbide material, as an example. In FIG. 2, the elongate flow ports 225 are arranged in a symmetrical pattern about centerline 206, the pattern extending radially from centerline 206 to a diametral extent indicated by the reference numeral 230. Diametral extent 230 is a diameter that describes the radially outermost reach of ports 225 at a given axial location. Since ports 225 are cylindrical and parallel to axis 206, diametral extent 230 is constant from inlets 227 to the exits 228. The length L220 of flow restrictor 220 is greater than its diameter D220 by a length-to-diameter ratio, L220/D220, having a value between, for example, 0.3 and 11. In some embodiments, the length-to-diameter ratio L220/D220 is between 0.2 and 15. In some embodiments, the length-to-diameter ratio L220/D220 is greater than 15 and less than 50.

The flow ports 225 form fluidly parallel paths with respect to each other. Each flow port 225 includes a central port axis 226, which may also be called a port centerline, an inlet 227, and an exit 228 spaced apart from the inlet 227 along axis 226. Each flow port 225 is characterized, at least in part, by a length L225 and a cross-sectional flow area perpendicular to port axis 226. Since ports 225 are parallel to centerline 206, the port length L225 is equal to the length L220 of flow restrictor 220. The exemplary embodiment of FIG. 2 has an even number of flow ports 225 and, more specifically, has four flow ports 225, and each port is round or circular, so its flow area is characterized by a diameter D. The length L225 and diameter D of the ports 225 are fixed, though variations may occur due to erosion. Because they are configured with fixed dimensions, ports 225 may also be called fixed orifices. Flow restrictor 220 may be replaced by another flow restrictor 220 when valve 200 is not in operation, and the replacement flow restrictor may include ports having different lengths or diameters. Length $L_{225}$ is greater than diameter D, making the ports 225 elongate. The length-to-diameter ratio L225/D of the ports is 9.8 in the exemplary embodiment of FIG. 2. In some embodiments, the ratio is between 0.3 and 11. The ports 225 of still other embodiments may have a length-to-diameter ratio that is outside this range. In some embodiments, the length-to-diameter ratio L225/D is between 0.2 and 15. In some embodiments, the length-to-diameter ratio L225/D is greater than 15 and less than 50. Orifice valve 200 and similar valves disclosed herein may also be called a bean valve, referring to a conventional unit of measurement for the size of an orifice in an oil well valve, a measurement which might be applied to ports 225, as is known in the industry.

Wear sleeve 240 is an elongate, annular member that includes a flow channel 242 formed by its inner surface, which includes a straight section 244 and an expanding section 246. The inside diameter of straight section 244 is greater than the diametral extent 230 of the multiple flow ports 225. In the example of FIG. 2, the radial distance between diametral extent 230 and the inside surface of straight section 244 is equal to or greater than the diameter of ports 225. Other embodiments may have a diametral extent closer to the surface of section 244 without touching section 244. At its terminal end, the inside diameter and the surface of the expanding section 246 conforms to the inside diameter of exit section 216 in of the valve body 205, against which section 246 abuts shoulder 218, providing a smooth flow path.

Configured as described, valve 200 has a flow path 250 that extends from inlet 207 to exit 208 and includes inlet section 212, flow ports 225, flow channel 242, and exit section 216. For each flow port 225, as a fluid exits the port 225, a turbulent fluid jet 255 forms within the downstream flow channel 242. Jet 255 extends along the corresponding port axis 226 from an initiating end 257 to a terminal end 258 through a length $L_{255}$. In at least one theoretical model or at least one embodiment, fluid jet 255 expands to a maximum diameter $D_{max}$ and then tapers down to a round tip or a point at the terminal end 258. In various flow conditions, such as shown in FIG. 2, fluid jet 255 and other fluid jets disclosed herein may be described as being flame-shaped or as being a "flame." The fluid flow of jet 255 is turbulent due at least in part to its high velocity and the sudden expansion it experiences upon exiting flow port 225. Eventually, the fluid of jet 255 mixes with and becomes the surrounding fluid in channel 242. This mixing process is essentially complete at terminal end 258.

Without being limited by any particular theory, jet 255 may be described in greater detail as including a central, fast fluid jet region 255A and an annular turbulent region 255B around the central jet. Jet region 255A carries the mass flow of fluid from the orifice, and on a time-averaged basis, jet region 255A extends straight down the centerline 226. Jet region 255A passes through the surrounding fluid in channel 242 causing these two fluid portions to rub together and mix, resulting in viscous swirling and creating turbulent movement in region 255B. On a time-averaged basis, this flow appears orderly, as presented in FIG. 2; however, on an instantaneous basis, the flow is chaotic. The viscous swirling in turbulent region 255B causes fluid energy to be turned into heat, some of which escapes through the pipe wall to the ambient, which is a mechanism that creates pressure drop in the valve.

Without being limited by any particular theory, the ports 225 are configured for at least one anticipated or selected inlet flow condition at inlet 207 and for at least one targeted or selected exit flow condition at exit 208, which are the design conditions for ports 225 and valve 200 as a whole. These design conditions may be defined based on one or more possible parameters such as, without limitation: fluid composition, pressure, flow rate, viscosity, temperature, or amount and size of entrained particles, as examples. The design conditions may be described by specific values or by a range of one or more of these parameters. Ports 225 are configured so that fluid jets 255 expand to their maximum diameter $D_{max}$ without touching the inner surface of the flow channel 242, at least when operating within the design conditions. The configuration of ports 225 refers at least to their length $L_{225}$, diameter D (and therefore flow area), diametral extent 230, the number of ports, and their direction with respect to centerline 206. With the design and the flow conditions exemplified by FIG. 2, the multiple, parallel jets 255 do not interact or interact minimally with each other, at least not in the immediate vicinity of each jet 255. Even so, during other flow conditions of the current embodiment or in other embodiments, jets 255 may expand into each other, preferably while avoiding impingement along the surface of channel 242 in the wear sleeve 240. Systematic changes or intermittent fluctuations that cause the fluid flow conditions to change from the design conditions may cause jets 255 to impinge along the surface of channel 242.

In various embodiments, valve 200 is configured for flow conditions that include an inlet pressures up to 20 kpsi (thousand pounds per square inch) at inlet 207 and exit pressures in the range of 0 to 18 kpsi at exit 208, resulting in a pressure drop in the range of 2 to 20 kpsi for the fluid that passes through the valve. Some of these embodiments are configured to operate and generate a high pressure drop of equal to or greater than 15 kpsi and up to 20 kpsi. Other embodiments of valve 200 may be configured to produce a high pressure drop of up to 25 kpsi, with appropriate flow conditions at inlet 207 and exit 208. Thus, valve 200 and other embodiments disclosed herein are configured to achieve high pressure drops for a fluid leaving the borehole of a hydrocarbon well, exceeding the typical pressure drops that are commonly achieved using conventional valves. So too, some embodiments are designed or may be operated to achieve a lower pressure drop, less than 15 kpsi. While various other embodiments are configured to operate with inlet pressure up to 50 kpsi or more, some of these produce a similarly higher pressure drop. These operating pressures and press drops also pertain to the other valves disclosed herein.

Without being limited by any particular theory, an exemplary method for configuring a choke valve in accordance with the disclosed embodiments will be described. The following discussion of design methodology applies to choke valve 200 and its components and also applies to various other embodiments disclosed herein. A purpose for the choke valves disclosed herein is to produce a high pressure drop in a fluid leaving the borehole of a hydrocarbon well. The fluid may be a hydrocarbon, a mixture of hydrocarbons, water, or any combination thereof. The fluid may include multiple phases such as liquid and gas. Establishing a configuration for the valve includes selecting or identifying the pressure drop, ΔP, the volumetric flow rate, Q, and total flow area, A, for the restrictions in the valve (i.e., the flow ports of the flow restrictor) and a flow capacity, Cv, for the valve. This flow capacity relates the pressure drop and volumetric flow rate of a valve and may be calculated as shown here:

$$C_v = Q\sqrt{\frac{G}{\Delta P}} \qquad 1$$

Where:
Q=volumetric flowrate in U.S. GPM
G=specific gravity of fluid relative to water
ΔP=pressure drop in psi.

For various embodiments, a Cv value of 4.2 is selected. In some other embodiments, a Cv value of 1.9 is selected. Cv values between 1.9 and 4.2 may be selected. Some embodiments may use a Cv value outside this range.

An existing flow restrictor of an existing choke valve may have one flow port rather than the multiple ports 255, and the total flow area of the flow restrictor is formed by that one flow port. In an example, the total flow area, A, of flow restrictor 220 in valve 200 may be set equal to the total flow area of a selected existing valve, perhaps a valve that will be replaced by valve 200. Establishing a configuration for the valve 200 also includes selecting a number of flow ports 225 for the flow restrictor 220 and dividing the total flow area, A, among the several flow ports. A greater number of flow ports reduces the maximum diameter, $D_{max}$, for each of the fluid jets that discharge from the flow ports and reduces the maximum diameter of the group of fluid jets that forms beyond the exits 228 of ports 225, reducing the potential for the group of fluid jets to contact and erode valve components downstream of the flow restrictor. The total flow area, A, of valve 200 is divided among the selected number of flow ports, and an initial value for the diameter D of the fluid ports 225 is evaluated. Round ports are discussed, but the flow ports could have another cross-sectional shape such as triangular, square, rectangular slots, hexagonal, oval, elliptical, etc. In general, some the several fluid ports may have differing flow areas or cross-sectional shapes, but for simplicity, the discussion will assume that all ports 225 have the same shape, equal flow area, and equal diameter.

Smaller flow ports are beneficial to reduce erosion, as explained. However, as described by the Darcy-Weisbach equation for fluid friction in a channel (given below), decreasing the hydraulic diameter of the flow ports could cause an increase in pressure drop magnitude. The hydraulic diameter of a pipe or a flow port equals 4*flow area/wetted-perimeter, which is equal to diameter D for a round port or a circular pipe. The Darcy-Weisbach equation for evaluating pressure drop, ΔP, is:

$$\Delta P = \frac{f\rho v^2 L}{2d} \qquad 2$$

where
L=length of the channel, for example length $L_{225}$ of a port 225
f=Darcy friction factor
ρ=fluid density
v=fluid velocity through the channel, e.g. the port 225, and
d=hydraulic diameter the channel, e.g. the port 225.

At least in ideal or theoretical conditions, the fluid passing through each of the multiple fluid ports 225 will experience the same value of pressure drop ΔP. Thus, it may be assumed that the entire flow through valve 200 will experience the pressure drop ΔP. Other equations or correlations may be advantageous for describing the flow in the fluid ports for various conditions or various embodiments.

An increase in pressure drop for the group of fluid ports would lower the valve's flow capacity below the targeted value that was previously selected. Hence it may be necessary to increase the diameter D of the fluid ports slightly beyond the initial value determined in the paragraph above, in order to achieve the selected flow capacity, Cv. Thus, the initially-selected total flow area may be modified (that is to say "enlarged," for example) in order to govern the pressure drop and achieve the selected flow capacity, Cv, when configuring a choke valve. As an example, when using a relatively small number of ports to achieve the selected total flow area A, such as 4 to 8 ports, it may be beneficial to increase the diameter D of each port by 2% beyond the initial value of the port diameter determined in the paragraph above. As a second example, if instead, more ports are used to achieve the selected total flow area A, perhaps 15 to 30 ports, then the initial value of the diameter for each port will, consequently, be smaller, potentially resulting in an even higher pressure drop. If Equation 2 predicts an unacceptably large pressure drop when using the initial value of diameter, then it may be beneficial to increase the diameter D of these smaller ports by a larger percentage (by more than 2% in this example) beyond the initial value of the port diameter. In general, the diameter D of each port may be increased by 1 to 15% beyond its initial value, with a large increase more likely to be applied for embodiments having a relatively larger number of ports. In some instances, the selected port diameter, D, will remain equal to the initial value of the port diameter.

Figure 3:
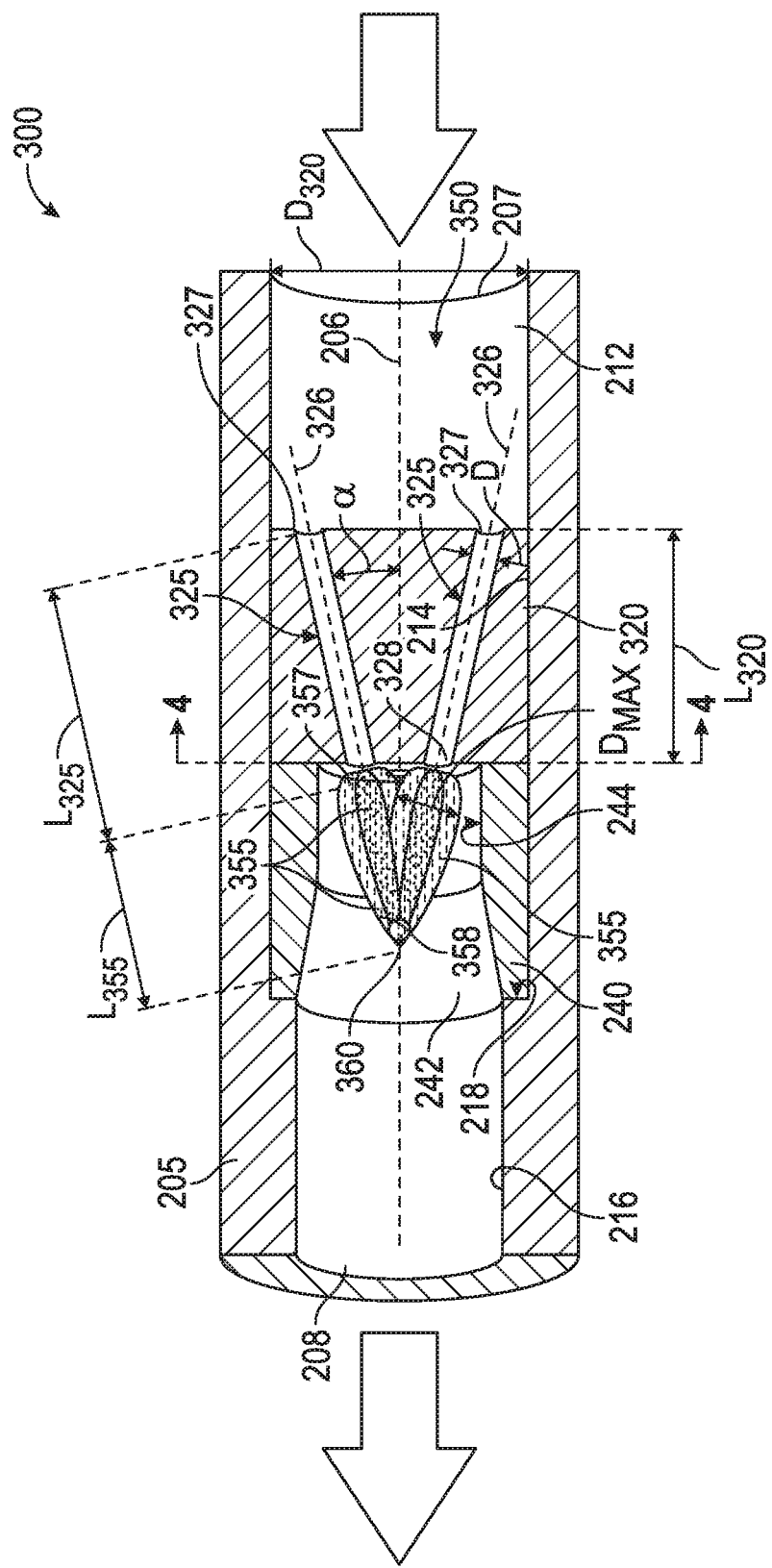
FIG. 3 shows a cross-sectional view of another embodiment of the choke valve of FIG. 1A, in accordance with principles described herein, the valve having orifices that angle or taper towards each other in the flow direction.

Referring to FIG. 3, in a second embodiment, a choke valve 300 having multiple flow orifices includes a valve body 205 and a wear sleeve 240, having the features and arrangement that were previously described. Valve 300 may replace valve 200 in system 100 (FIG. 1A). To facilitate discussion, valve body 205 and a wear sleeve 240 are marked with some of the same reference numerals that were previously defined and marked in FIG. 2.

Continuing to reference FIG. 3, in place of flow restrictor 220, valve 300 has an insert or flow restrictor 320, which is similarly received within the mid-section 214 of the corresponding valve body 205. Flow restrictor 320 is centered on and aligned with centerline 206. The length $L_{320}$ and diameter $D_{320}$ of flow restrictor 320 are equal to or similar to the length $L_{220}$ and diameter $D_{220}$ of flow restrictor 220, respectively, and the length-to-diameter ratio, $L_{320}/D_{320}$ corresponds to the same ranges mentioned with regard to flow restrictor 220.

Flow restrictor 320 includes a cylindrical body with multiple orifices or flow ports 325 extending through it. At least in the exemplary embodiment, restrictor 320 is solid between and beyond ports 325 and is elongate. However, unlike ports 225 in flow restrictor 220, the ports 325 are positioned at an acute angle α (alpha) with respect to body centerline 206 and extending radially closer centerline 206 in the flow direction (right-to-left in FIG. 3). The angle α will also be called a port angle. Each flow port 325 includes a central port axis 326, which may also be called a port centerline, an inlet 327, and an exit 328 spaced apart from the inlet along axis 326. Due to the angle α, each port exit 328 is closer to centerline 206 than is the corresponding port inlet 327. Each flow port 325 is characterized, at least in part, by a length $L_{325}$ and a cross-sectional flow area perpendicular to port axis 326. The example of FIG. 3 has an even number of the flow ports 325 and, more specifically, has four flow ports 325, and each port is round, so its flow area is characterized by a diameter D. Length $L_{325}$ is greater than diameter D, making the ports 325 elongate. The length-to-diameter ratio L325/D of the ports 325 is between 0.3 and 11 in various embodiments. The ports 325 of still other embodiments may have a length-to-diameter ratio that is outside this range, as described for ports 225. The axis 326 of each port 325 is displaced from centerline 206 by the angle α, making the port length $L_{325}$ longer than the length $L_{320}$ of flow restrictor 320. In the example of FIG. 3, port angle α is 11° (eleven degrees). Based on angle α, the multiple port axes 326 intersect at an impingement focal point 360 located downstream from flow restrictor 320.

Figure 4:
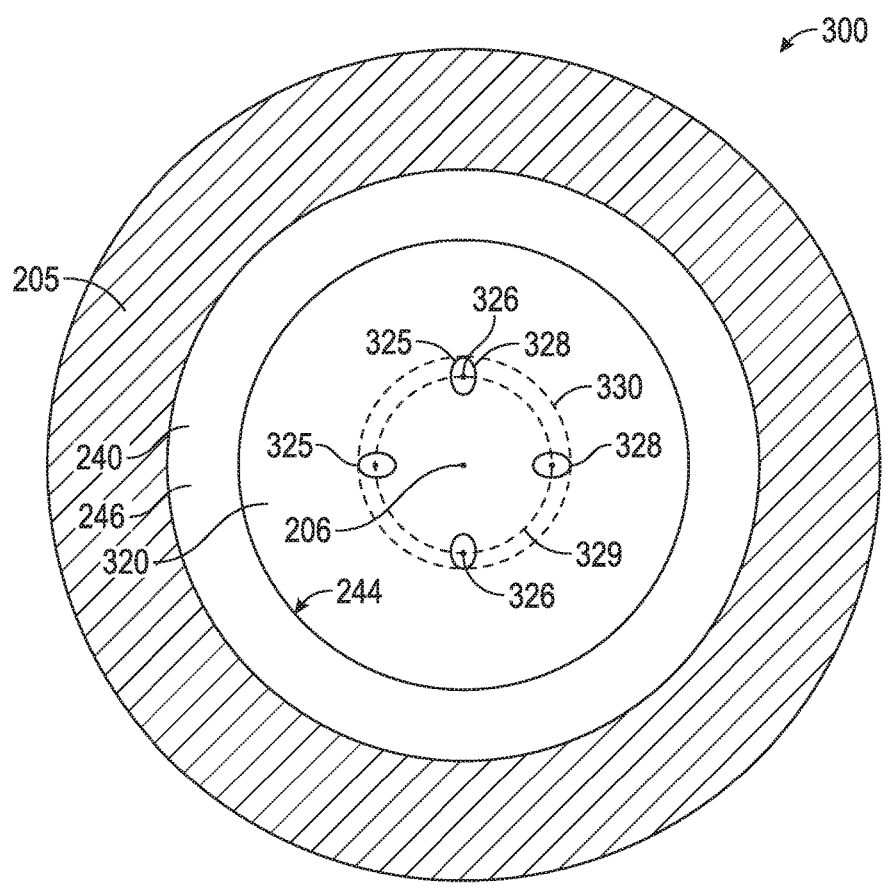
FIG. 4 shows a sectional view of the choke valve of FIG. 3 along a section 4-4.

Referring now to the sectional view of FIG. 4 taken perpendicular to axis central 206, flow ports 325 are arranged in a symmetrical, circular pattern about centerline 206, such that port axes 326 are positioned on a centerline circle 329 at exits 328. At exits 328, the circular pattern of ports 325 extends radially from centerline 206, past circle 329, to a diametral extent indicated by the reference numeral 330. Diametral extent 330 is less than the inside diameter of straight section 244 of wear sleeve 240. In the example of FIG. 4, the radial distance between diametral extent 330 and the inside surface of straight section 244 is equal to or greater than the diameter of ports 325.

Referring again to FIG. 3, configured as described, valve 300 has a flow path 350 that extends from inlet 207 to exit 208 and includes inlet section 212, flow ports 325, flow channel 242, and exit section 216. As a fluid exits each port 325, a fluid jet 355 forms within the downstream flow channel 242. Jet 355 extends along the corresponding port axis 326 from an initiating end 357 to a terminal end 358 through a length $L_{355}$. Fluid jet 355 expands to a maximum diameter $D_{max}$ and then tapers down to a round tip or a point at the terminal end 358. In various embodiments and operational conditions, the value of $D_{max}$ for jet 355 may be equal to or substantially equal to the value of $D_{max}$ for the fluid jets 255 of valve 200. The flow within jet 355 is turbulent. Eventually, the fluid of jet 355 mixes with and becomes the surrounding fluid in channel 242. This mixing process is essentially complete at terminal end 358.

Without being limited by any particular theory, the ports 325 are configured based on the same concepts as applied to ports 225 of valve 200 but with the addition of the acute port angle α. Ports 325 are configured so that fluid jets 355 expand to their maximum diameter $D_{max}$ without touching the inner surface of the flow channel 242, at least when operating at a selected design condition for high pressure drop, as previously discussed. The inclusion of a port angle greater than zero, such as angle α, may reduce the combined size of the multiple fluid jets 325, which has the effect of preventing or reducing the likelihood for the fluid jets to touch the inner surfaces of the wear sleeve 240 or valve body 205. Thus, port angle α may provide a configuration in which various components of valve 300 are less susceptible to erosion than are various components of valve 200, which has parallel ports 225. The configuration of ports 325 in flow restrictor 320 refers at least to the following parameters: length $L_{325}$, diameter D, diametral extent 330, and port angle α. In various instances, based one or more of these parameters, the multiple jets 355 interact with each other along at least a portion of their length with the terminal ends 358 merging together along with port axes 326 at the impingement focal point 360, which may also be called an impingement point.

Figure 5:
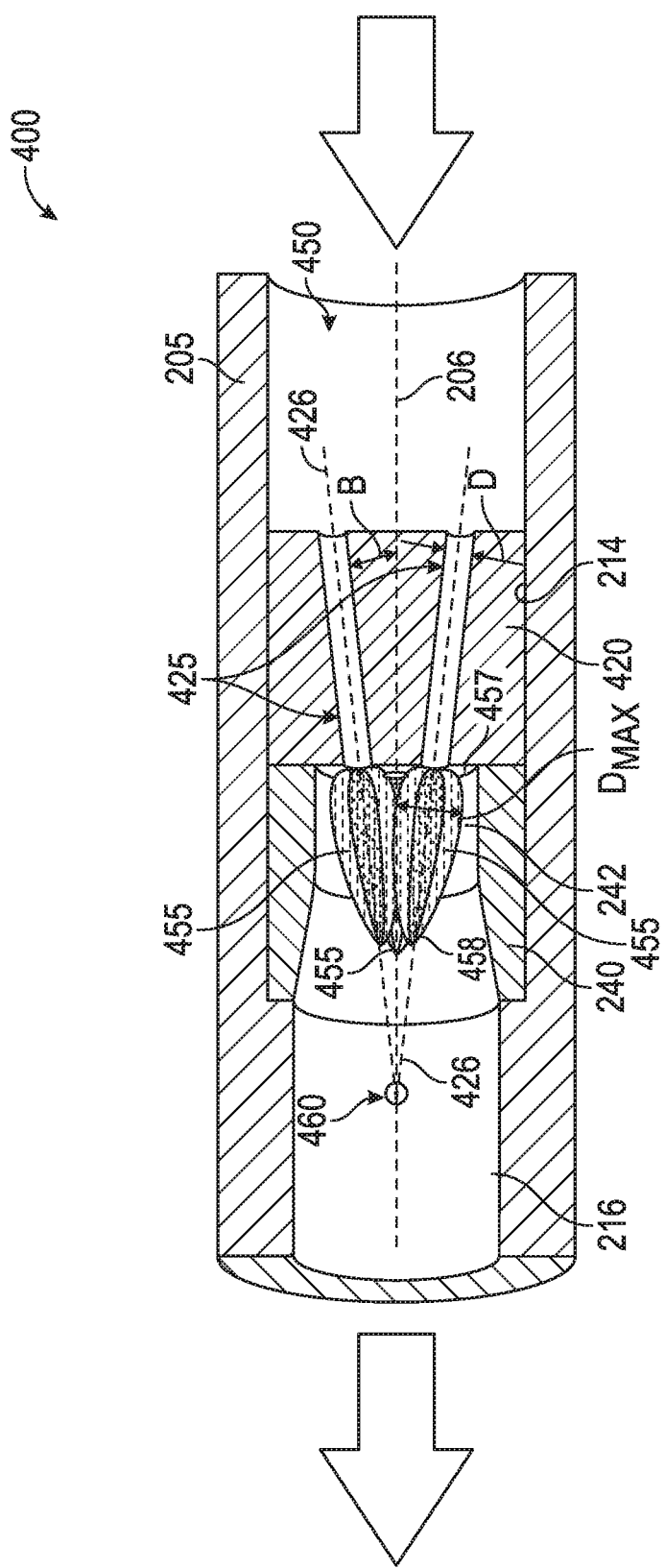
FIG. 5 shows a cross-sectional view of still another embodiment of the choke valve of FIG. 1A, in accordance with principles described herein, the valve having orifices that angle or taper towards each other in the flow direction.

Referring to FIG. 5, in a further embodiment, a choke valve 400 having multiple flow orifices includes a valve body 205, a wear sleeve 240 having the features and arrangement that were previously described, and an elongate and cylindrical insert or flow restrictor 420. Valve 400 may replace valve 200 in system 100 (FIG. 1A). To facilitate discussion, valve body 205 and a wear sleeve 240 are marked with some of the same reference numerals that were previously defined and marked in FIG. 2 or FIG. 3.

Continuing to reference FIG. 5, flow restrictor 420 is similar to flow restrictor 320 and is similarly received within the mid-section 214 of the valve body 205. The length and diameter of flow restrictor 420 are equal to or similar to the length and diameter of flow restrictor 220 or flow restrictor 320, respectively, and the length-to-diameter ratio corresponds to the same ranges mentioned with regard to flow restrictor 220.

Like flow restrictor 320, flow restrictor 420 includes a cylindrical body with multiple orifices or flow ports 425 extending through it and positioned at an acute port angle with respect to body centerline 206. At least in the exemplary embodiment, restrictor 420 is solid between and beyond ports 425 and is elongate. The elongate flow ports 425 extend radially closer to centerline 206 in the flow direction (right-to-left in FIG. 5). The example of FIG. 5 has an even number of round flow ports 425 and, more specifically, has four flow ports 425 arranged in a symmetrical, circular pattern about centerline 206. Each port 425 has a central, port axis 426 that is displaced from the body centerline 206 by an angle β, making the port length longer than the length of flow restrictor 420. Port axis 426 may also be called a port centerline. In the example of FIG. 5, port angle β is 6°, less than angle α of flow restrictor 320. Consequently, the multiple port axes 426 intersect at an impingement focal point 460 located further downstream from flow restrictor 420 than is the impingement focal point 360 distant from flow restrictor 320 (FIG. 3). The length-to-diameter ratio of the ports 425 is 9.9 in FIG. 5 and is between 0.3 and 11 in some other embodiments. The ports 425 of still other embodiments may have a length-to-diameter ratio that is outside this range, as described for ports 225.

Valve 400 has a flow path 450 configured like flow path 350 of valve 300, except, flow ports 425 replace flow ports 325. As a fluid exits the each flow port 425, a turbulent fluid jet 455 forms within the downstream flow channel 242. Jet 455 extends along the corresponding port axis 426 from an initiating end 457 to a terminal end 458, expanding to a maximum diameter $D_{max}$ and then tapering down to a round tip or a point. For design and flow conditions comparable to those discussed for valve 300, the multiple fluid jets 455 of valve 400 may interact with each other along at least a portion of their length; however, the terminal ends 358 may remain separated from each other. The separation of jet ends 358 results at least in part due to the smaller angle β, as compared to the angle α of flow restrictor 320. Fluids from the several jets 455 mix with and becomes the surrounding fluid in channel 242. Jets 455 terminate or disperse at ends 358 without reaching impingement focal point 460. The fluid from jets 455 continues to flow toward and beyond focal point 460. The ports 425 are configured based on the same concepts as applied to ports 325 of valve 300. Ports 425 are configured so that fluid jets 455 expand to their maximum diameter $D_{max}$ without touching the inner surface of the flow channel 242, at least when operating at a selected design condition for high pressure drop, as previously discussed. The inclusion of a port angle β greater than zero may reduce the combined size of the multiple jets 425 and prevents or reduces the likelihood for the fluid jets to touch the inner surfaces of valve 400, as compared to parallel jets 225 of valve 200. Because port angle β is smaller than angle α of flow restrictor 320, jets 455 have a higher probability of touching flow channel 242 or valve body 205 than do jets 355 formed from flow restrictor 320. However, based on the smaller angle β, the jets 455 may provide a more gentle flow path 450, than do the jets 355 so that jets 455 are less likely to allow entrained particles, when present, to impact the inner wall of valve body 205 or of wear sleeve 240. Similar to ports 325, at their exit ends, ports 425 are located within a diametral extent from centerline 206 that is less than the inside diameter of straight section 244 of wear sleeve 240. In the example of FIG. 4, the radial distance between diametral extent of ports 425 and the inside surface of straight section 244 is equal to or greater than the diameter of ports 425.

The embodiments of FIG. 3 and FIG. 5 are configured to operate at the same or generally the same design conditions, i.e., same flow conditions, as described above for valve 200 of FIG. 2, including conditions that result in high pressure drop within the valves. The performance of these embodiments is anticipated to vary based on at least port angle α, (β. Though the valves 300 and 400 include flow ports set at an angle relative to the body centerline such that the flow ports are not geometrically parallel to each other, the fluid paths in these ports may be said to be "fluidly parallel" in the sense that the ports are concentrically disposed in the restrictor body or radially adjacent each other in the restrictor body such that the overall flow path in the valves 300 and 400 directs the fluid in the same overall direction.

Examples of various embodiments have been expressly presented. Multiple additional variations and uses are possible in accordance with principles described herein.

For example, various embodiments of flow restrictors may have any practical number of flow ports such as 2, 3, 4, up to 10, up to 20, and up to 30 ports, as examples. The number of ports may be even or odd. However, in some embodiments, the inclusion of an even number of flow ports appears to reduce the potential for turbulent fluid or entrained particles to impact the inner walls of the valve. In some embodiments, a flow port lies along centerline 206 in addition to the flow ports that are positioned around the centerline.

For valve 200 and flow restrictor 220, a single length and a single diameter was discussed for the ports 225. However, in some embodiments based on valve 200, one or more of the multiple ports has a different length or a different diameter than another port in the same flow restrictor. Similar variations in flow port length or diameter may be achieved in various embodiments build based on valves 300, 400.

Figure 6:
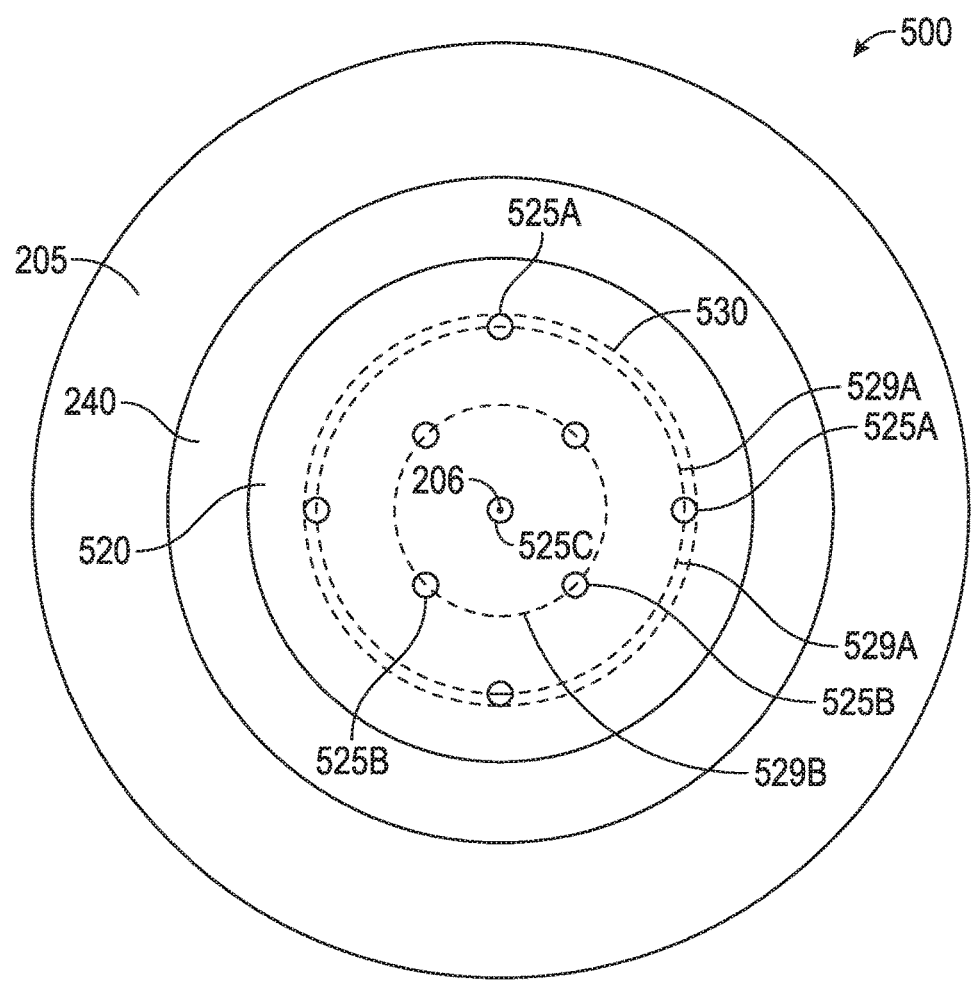
FIG. 6 shows the exit end of another embodiment of the choke valve of FIG. 1A, in accordance with principles described herein.

FIG. 6 presents another embodiment, showing the exit-end of a choke valve 500, which includes a valve body 205 and a wear sleeve 240, having the features and an arrangement that was previously described. Valve 500 may replace valve 200 in system 100 (FIG. 1A). Valve 500 has an insert or flow restrictor 520, which is received within mid-section 214 (as defined earlier) of valve body 205. Flow restrictor 520 includes multiple, circular patterns or sets of flow ports 525A,B,C spaced at different distances from centerline 206, and the various ports have different lengths. Flow restrictor 520 is cylindrical and has a centerline that is centered on and aligned with valve body centerline 206. The length-to-diameter ratios of flow restrictor 520 and of the flow ports 525A,B,C fall within the same ranges mentioned with regard the flow restrictors 220, 320, 420.

A first set of flow ports 525A is located on a centerline circle 529A. A second set of flow ports 525B is located on a centerline circle 529B, smaller than circle 529A. A third set includes a single flow port 525C locate on centerline 206. Circles 529A,B are centered on centerline 206. On the face of flow restrictor 520, ports 525B are offset from ports 525A by an angular distance of 45 degrees, although other angular offsets are possible. Flow restrictor 520 includes four of the ports 525A, four of the ports 525B, and one port 525C. In some embodiments, more or fewer flow ports are possible. The exit ends 528A of flow ports 525A are shown as elliptical because ports 525A extend along a tapered line with respect to centerline 206 while the end face of flow restrictor 520 is perpendicular to centerline 206, at least in this embodiment. The exit ends 528B,C of the other flow ports are shown as circular because ports 525B,C extend parallel to centerline 206. Thus, ports 525A have different orientations and different lengths that ports 525B,C. The length-to-diameter ratios of the ports 525A,B,C are similar to the ratios previously described.

The outermost, first set of flow ports 525A extend to a diametral extent indicated by the reference numeral 530. Broadly, diametral extent 530 is descriptive of all flow ports 525A,B,C. Diametral extent 530 is less than the inside diameter of straight section 244 of wear sleeve 240. In the example of FIG. 6, the radial distance between diametral extent 330 and the inside surface of straight section 244 is equal to or greater than the diameter of ports 325.

As described for flow ports 225 of flow restrictor 220, so also for flow restrictors 300, 400, 500, the length and diameter (i.e. flow area) of the flow ports are fixed, except for variations due to erosion. Because they are configured with fixed dimensions, ports 325, 425, 525A,B,C may also be called fixed orifices.

In some embodiments, one or more of the flow ports have a flow area (that is to say the cross-sectional shape perpendicular to the longitudinal or central axis of the port) that is not round but rather is triangular, square, rectangular slots, hexagonal, oval, and elliptical, as examples. Although, the various flow ports in the flow restrictors have been shown as straight, in some embodiments, one or more of the flow ports may be curved, tapered, or turning (such as a helical flow path), as examples.

In valves 200, 300, 400, the ports 225, 325, 425 were disposed at port angles of zero (parallel), 11, and 6 degrees, respectively. In other embodiments, another port angle between zero and 11 degrees may be chosen to balance the goal of reducing the potential for the turbulent fluid jets to impact the inner surfaces of a valve and the goal of keeping particles entrained, reducing their potential for impact the inner surfaces of the valve at locations beyond the length of the turbulent fluid jets. Some other embodiments may include a port angle up to 15 degrees or up to 20 degrees, as examples.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the principles disclose herein. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method.

What is claimed is:

1. An orifice valve for reducing the pressure of a fluid flowing from an oil well, the valve comprising:
    a valve body including a body centerline and a through-bore having a fluid inlet section;
    a flow restrictor disposed within the through-bore adjacent the fluid inlet section, the flow restrictor including a non-rotating body, an outer surface, and a plurality of elongate, fluidly parallel ports extending through the body, wherein the ports are configured with fixed dimensions; and
    a wear sleeve disposed within the through-bore adjacent the flow restrictor and including an annular body, a flow channel extending through the body and including a straight section and an expanding section, wherein the flow channel is in fluid communication with the fluidly parallel ports;
    wherein a flow path extends from the fluid inlet section, is divided by the fixed-dimension ports, and recombines in the flow channel; and
    wherein the fixed-dimension ports extend from the fluid inlet section to the flow channel.

2. The orifice valve of claim 1 wherein the ports of the flow restrictor circumferentially surround the body centerline;
    wherein each port of the flow restrictor includes a port centerline; and
    wherein the port centerlines are disposed at a port angle with respect to the body centerline, the port angle being acute.

3. The orifice valve of claim 2 wherein the port centerlines intersect within the wear sleeve.

4. The orifice valve of claim 3 wherein the port centerlines intersect within the expanding section of the wear sleeve at a point along the body centerline.

5. The orifice valve of claim 2 wherein the port centerlines extend through the wear sleeve, continue in that direction, and then intersect within the through-bore of the valve body beyond the wear sleeve.

6. The orifice valve of claim 2 wherein the port angle is between 10 to 12 degrees.

7. The orifice valve of claim 2 wherein the port angle is between 4 and 8 degrees.

8. The orifice valve of claim 1 wherein the ports are circular, each port having a port length and a port diameter; and
    wherein for each port, the port length is greater than the port diameter.

9. The orifice valve of claim 8 wherein the length-to-diameter ratio of the port length and the port diameter is between 0.3 and 11.

10. An orifice valve for reducing the pressure of a fluid flowing from an oil well, the valve comprising:
    a valve body including a body centerline and a flow path passing through the valve body, the flow path comprising:
        an inlet section;
        a plurality of elongate flow ports disposed within the valve body, each port including a port inlet and a port exit and extending from the inlet section in the direction of the body centerline, the flow ports being continuous and configured with fixed diameters from the port inlet to the port exit; and
        a downstream flow channel located beyond the flow ports in the direction of fluid flow and having an inner surface and a straight section with a straight section diameter;
    wherein from the inlet section, the flow path divides among the fixed-diameter flow ports, and from the flow ports, the flow path recombines within the downstream flow channel;
    wherein the port exits are arranged within a diametral extent that is less than the straight section diameter.

11. The orifice valve of claim 10 wherein the flow ports are circular in cross-section, characterized by a diameter D;
    wherein the distance between the diametral extent and the straight section diameter measured along a radius from the body centerline is greater than or equal to the diameter D.

12. The orifice valve of claim 10 wherein each of the flow ports includes a port centerline;
    wherein the inlets of the flow ports are more widely spaced apart than are the exits so that each port and each flow port's corresponding port centerline is oriented at a port angle with respect to the body centerline, the port angle being acute.

13. The orifice valve of claim 12 wherein the port centerlines intersect within the downstream flow channel.

14. The orifice valve of claim 12 wherein the downstream flow channel includes an expanding section extending from the straight section;
    and
    wherein the port centerlines intersect beyond the straight and expanding sections of the downstream flow channel.

15. The orifice valve of claim 10 further comprising a flow restrictor formed separately from the valve body and installed within the valve body, wherein the flow ports extend through the flow restrictor.

16. The orifice valve of claim 10 wherein the flow path is configured to generate a pressure drop of between 15 and 20 kpsi in the fluid.

17. The orifice valve of claim 10 wherein the flow ports are circular, each port having a port length, a port diameter, and a corresponding length-to-diameter ratio; and
    wherein the length-to-diameter ratio is between 0.3 and 11.

18. An orifice valve for reducing the pressure of a fluid flowing from an oil well, the valve comprising:
- a valve body; and
- a flow path extending through the valve body and comprising:
  - an inlet section;
  - a plurality of elongate flow ports disposed within the valve body, each port including a port inlet located to receive fluid from the inlet section and a port exit, the flow ports being continuous and configured with fixed diameters from the port inlet to the port exit; and
  - a downstream flow channel located to receive fluid from the plurality of port exits and including an expanding section;
- wherein from the inlet section, the flow path divides among the fixed-diameter flow ports, and from the flow ports, the flow path recombines within the downstream flow channel.

19. The orifice valve of claim 18 wherein the downstream flow channel includes a straight section located between the port exits and the expanding section, the straight section having a straight section diameter; and
- wherein the port exits are arranged within a diametral extent that is less than the straight section diameter.

20. The orifice valve of claim 18 further comprising a removable wear sleeve disposed entirely within the valve body, the wear sleeve comprising the expanding section of the flow path.

* * * * *